(12) United States Patent
Geurts et al.

(10) Patent No.: US 10,859,505 B2
(45) Date of Patent: Dec. 8, 2020

(54) FLUORESCENCE BOX FOR GEMOLOGICAL APPLICATIONS

(71) Applicant: Gemological Institute of America, Inc. (GIA), Carlsbad, CA (US)

(72) Inventors: Ronald Geurts, Hove (BE); Wuyi Wang, Edison, NJ (US); Alex Balter, Carlsbad, CA (US); Christopher M. Breeding, San Diego, CA (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 0 days.

(21) Appl. No.: 15/881,583

(22) Filed: Jan. 26, 2018

(65) Prior Publication Data

US 2019/0234886 A1    Aug. 1, 2019

(51) Int. Cl.
| | | |
|---|---|---|
| *G01N 21/88* | (2006.01) | |
| *G01N 21/87* | (2006.01) | |
| *G01N 21/64* | (2006.01) | |
| *G01N 21/93* | (2006.01) | |

(52) U.S. Cl.
CPC ......... *G01N 21/88* (2013.01); *G01N 21/6452* (2013.01); *G01N 21/87* (2013.01); *G01N 21/93* (2013.01); *G01N 21/6447* (2013.01); *G01N 2021/8854* (2013.01); *G01N 2201/0621* (2013.01); *G01N 2201/0686* (2013.01)

(58) Field of Classification Search
CPC .... G01N 21/88; G01N 21/6452; G01N 21/87; G01N 2201/0686; G01N 2021/8854; G01N 2201/0621
See application file for complete search history.

(56) References Cited

U.S. PATENT DOCUMENTS

| | | | | |
|---|---|---|---|---|
| 4,527,895 A | | 7/1985 | Rubin | |
| 4,534,644 A | * | 8/1985 | Beesley | G01J 3/52 356/30 |
| 4,626,684 A | * | 12/1986 | Landa | G01N 21/6452 250/328 |
| 4,824,249 A | * | 4/1989 | Lucas | G01N 21/67 356/311 |
| 5,064,281 A | * | 11/1991 | Davis | G01J 3/52 356/30 |
| 5,260,584 A | * | 11/1993 | Popson | G01N 21/474 250/205 |
| 5,510,891 A | * | 4/1996 | Frangie | G01B 9/00 292/251.5 |
| 5,559,436 A | * | 9/1996 | Matthews | G01N 27/72 324/228 |

(Continued)

OTHER PUBLICATIONS

International Search Report and Written Opinion received for PCT Patent Application No. PCT/US2018/016516, dated Apr. 13, 2018, 8 pages.

*Primary Examiner* — Mohamed K Amara
(74) *Attorney, Agent, or Firm* — DLA Piper LLP (US)

(57) ABSTRACT

Some examples herein include systems and methods of creating standards of gemstones of various classifications, which may display certain characteristics of the various classifications when excited by ultraviolet radiation and fluoresce in response. In some examples, a set of standards are created using fluorescent material, filters, and a radiation source to compare against a sample gemstone.

14 Claims, 7 Drawing Sheets

(56) References Cited

U.S. PATENT DOCUMENTS

| | | | | |
|---|---|---|---|---|
| 5,667,764 A * | 9/1997 | Kopia | A61K 41/0085 | 424/1.45 |
| 6,002,477 A * | 12/1999 | Hammer | G01J 3/42 | 356/307 |
| 6,014,208 A * | 1/2000 | Welbourn | G01N 21/87 | 356/237.1 |
| 6,020,954 A * | 2/2000 | Aggarwal | G01N 21/87 | 356/30 |
| 6,191,852 B1 * | 2/2001 | Paffhausen | G01N 21/6452 | 356/244 |
| 6,281,680 B1 * | 8/2001 | Matthews | G01N 27/72 | 324/228 |
| 6,304,853 B1 * | 10/2001 | Malnekoff | G01N 21/87 | 705/27.1 |
| 6,473,164 B1 * | 10/2002 | De Jong | G01N 21/87 | 356/30 |
| 6,753,966 B2 * | 6/2004 | Von Rosenberg | G01J 3/02 | 356/432 |
| 6,980,283 B1 * | 12/2005 | Aggarwal | G01N 21/87 | 356/30 |
| 7,102,742 B2 | 9/2006 | Geurts | | |
| 7,499,154 B2 * | 3/2009 | Stock | G01N 21/251 | 356/73 |
| 7,834,987 B2 * | 11/2010 | Reinitz | G01N 21/87 | 356/31 |
| 8,317,521 B2 * | 11/2012 | Lapa | G09B 5/02 | 356/30 |
| 8,680,484 B2 * | 3/2014 | Takahashi | G01N 21/6452 | 250/458.1 |
| RE44,963 E * | 6/2014 | Shannon, Sr. | G01N 21/87 | 356/30 |
| 9,212,995 B2 * | 12/2015 | Moll | G01N 21/7703 | |
| 9,534,951 B2 * | 1/2017 | Buchwald | G01N 21/474 | |
| 2002/0089658 A1 * | 7/2002 | Seville | G01N 21/6447 | 250/458.1 |
| 2002/0099511 A1 * | 7/2002 | Matsushita | G01N 21/274 | 702/104 |
| 2004/0247485 A1 * | 12/2004 | Kraus | G01N 21/6452 | 422/82.08 |
| 2005/0051733 A1 * | 3/2005 | Wiki | G01N 21/6428 | 250/453.11 |
| 2005/0151959 A1 * | 7/2005 | Geurts | G01N 21/64 | 356/30 |
| 2005/0287040 A1 * | 12/2005 | Giebeler | B01L 3/5085 | 422/82.08 |
| 2006/0063274 A1 * | 3/2006 | Schremp | G01N 21/278 | 436/180 |
| 2006/0289787 A1 * | 12/2006 | Ohman | B01L 3/502746 | 250/458.1 |
| 2008/0013092 A1 * | 1/2008 | Maltezos | G01N 21/6452 | 356/417 |
| 2009/0051897 A1 * | 2/2009 | Gumpesberger | B07C 5/3427 | 356/30 |
| 2011/0076687 A1 * | 3/2011 | Haberstroh | B01L 3/50857 | 435/6.19 |
| 2012/0097864 A1 * | 4/2012 | Takahashi | G01N 21/6428 | 250/458.1 |
| 2013/0016210 A1 * | 1/2013 | Smith | G01N 21/55 | 348/135 |
| 2013/0156938 A1 * | 6/2013 | Geddes | G01N 21/64 | 427/8 |
| 2013/0293116 A1 * | 11/2013 | Carreras Molins | H05B 33/0872 | 315/152 |
| 2013/0321792 A1 * | 12/2013 | Shapiro | G01N 21/65 | 356/30 |
| 2014/0045186 A1 * | 2/2014 | Gubatayao | B01L 7/52 | 435/6.12 |
| 2014/0206580 A1 * | 7/2014 | Grudzien | G01N 21/6452 | 506/18 |
| 2015/0031121 A1 * | 1/2015 | Nakatani | G01N 21/6452 | 435/288.7 |
| 2016/0178530 A1 * | 6/2016 | Davies | G01N 21/87 | 209/578 |
| 2016/0187333 A1 * | 6/2016 | Moll | G01N 33/54373 | 506/9 |
| 2016/0334341 A1 * | 11/2016 | Moore | G01N 21/94 | |
| 2017/0212106 A1 * | 7/2017 | Linke | B01L 3/502761 | |
| 2018/0172599 A1 * | 6/2018 | Wang | G01N 21/645 | |
| 2018/0264464 A1 * | 9/2018 | Greef | B01L 3/5023 | |
| 2018/0364822 A1 * | 12/2018 | Taya | G06F 3/017 | |

* cited by examiner

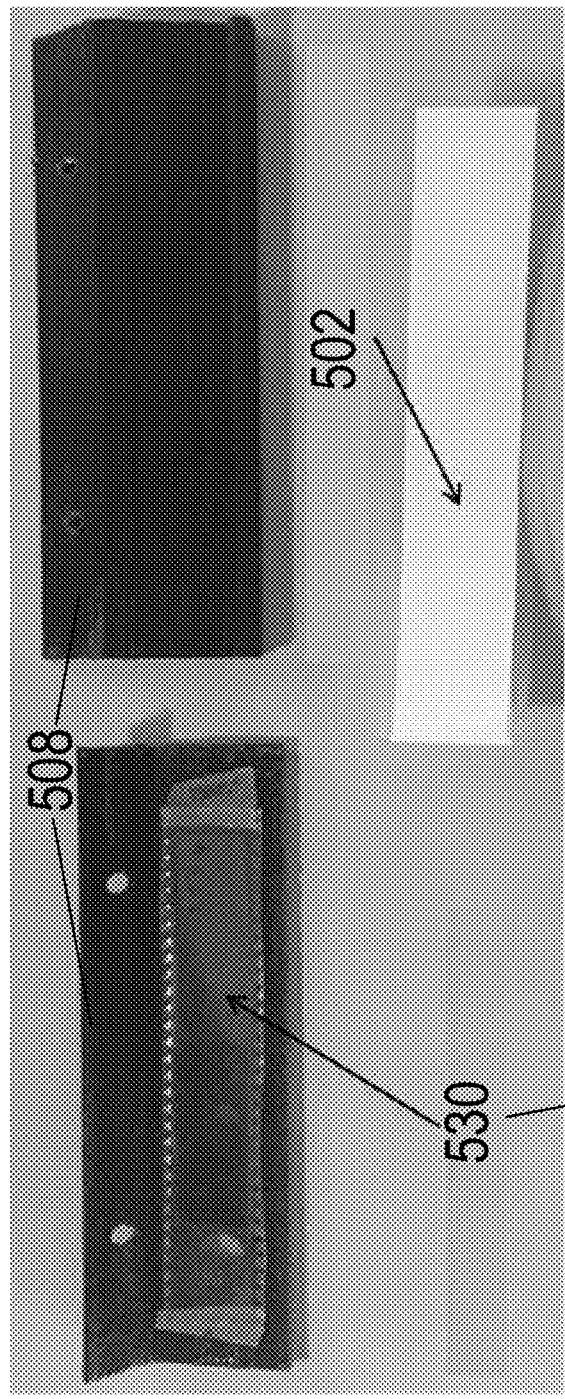
FIG. 5A
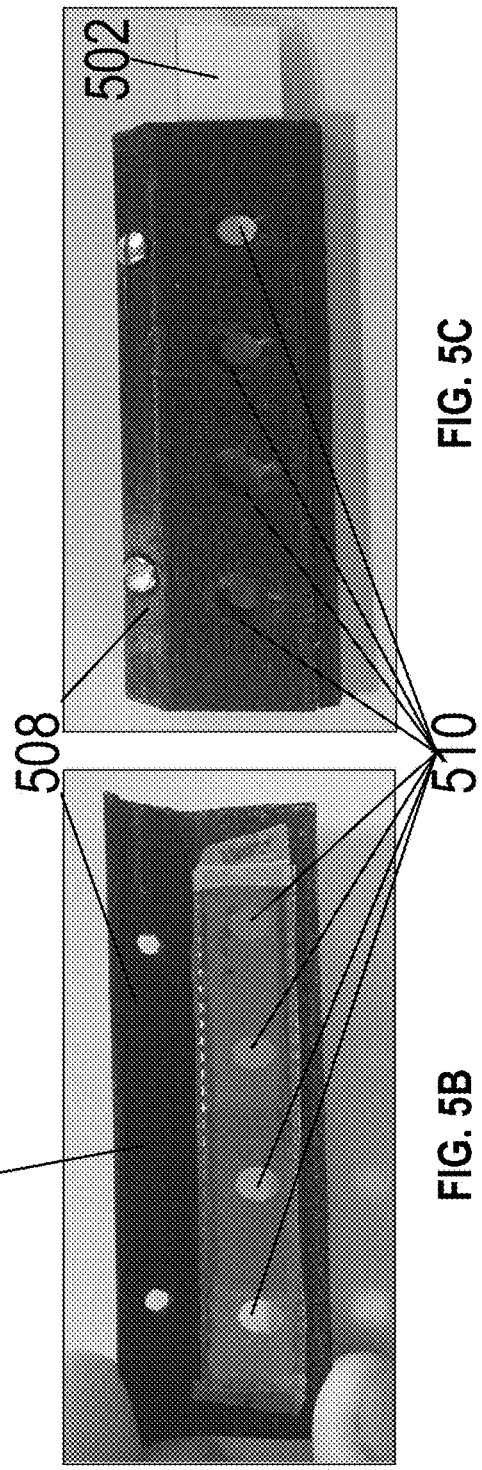
FIG. 5C
FIG. 5B

US 10,859,505 B2

FLUORESCENCE BOX FOR GEMOLOGICAL APPLICATIONS

TECHNICAL FIELD

This application relates to the field of gemology and the use of standards for comparison. In some examples, the gemological study includes the use of ultraviolet excitation and fluorescence.

BACKGROUND

The study of gemstones often includes the comparison of a sample gem to some type of standard in order to facilitate the identification and classification of the sample gem. In some examples, the gemological study includes the use of ultraviolet excitation of the gems to produce fluorescence. But creating useful standards in order to allow gemologists to compare to a sample can be difficult as well as expensive. Further, the use of conventional ultraviolet (UV) lamps including mercury bulbs that emit a range of excitations does not usually aid in examination. There is a need to create accurate and practical standards for use by gemologists which may be used to compare to an unknown sample, in order to help classify gems.

SUMMARY

Some examples presented here include systems and methods of creating standards of gemstones of various classifications, which may display certain characteristics of the various classifications when excited by ultraviolet light.

Some example embodiments include preparing a strip having a first end and a second end, with fluorescent material in increasing amounts from the first end to the second end, then placing the strip in a holder with openings, such that the increasing amount of fluorescent material is shown through the openings, creating divided categories, then placing the holder on a stage, wherein the stage is large enough to accommodate the holder and a sample gemstone, then placing a radiation source above the holder and strip; applying the radiation from the radiation source to the holder, the strip, and the stage.

Additionally or alternatively, some embodiments include adding a filter in the holder with the strip. Additionally or alternatively, in some embodiments, the radiation source emits a wavelength of about 365 nm. Additionally or alternatively, in some embodiments, the radiation source emits a wavelength between 350 nm and 375 nm. Additionally or alternatively, in some embodiments, the holder openings are four in number. Additionally or alternatively, in some embodiments, the fluorescent material is paper with brightness>90%. Additionally or alternatively, in some embodiments, the holder is coated in material that does not fluoresce. Additionally or alternatively, in some embodiments, the stage and the radiation source are 2¾ inches apart. Additionally or alternatively, in some embodiments, the strip includes various combinations of neutral density filters.

Some example embodiments comprise a main body including a stage and a radiation source, a holder adapted to fit onto the stage, the holder including a plurality of openings, the holder coated in material that does not fluoresce, a strip having a first end and a second end, the strip including fluorescent material in increasing amounts from the first end to the second end. In some examples, the strip is adapted to fit into the holder such that the increasing amount of fluorescent material is shown through the openings, creating divided categories. In some examples, the radiation source is configured above the stage to emit radiation onto the holder, the strip, and the stage.

BRIEF DESCRIPTION OF THE DRAWINGS

For a better understanding of the technology described in this document, as well as any embodiments thereof, reference should be made to the description below, in conjunction with the following figures in which like reference numerals refer to corresponding parts throughout the figures.

FIGS. 5A-5C show examples of the potential compositions of the components used to practice the inventions described herein.

DETAILED DESCRIPTION

Figure 1A:
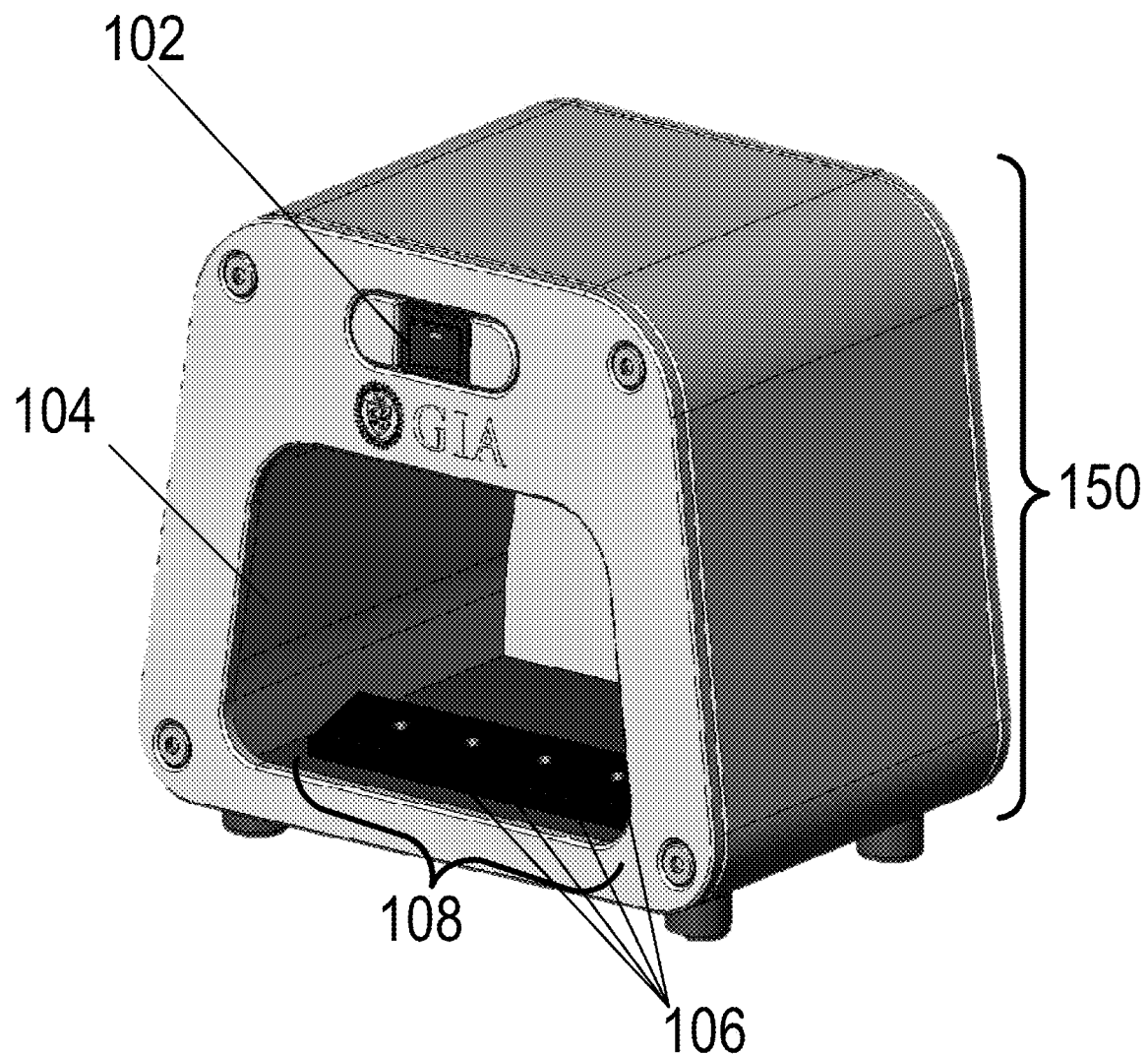
FIGS. 1A-1B show an example embodiment developed to practice the inventions described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments.

Gemstone Grade Overview

Traditionally, precious stones, referred to interchangeably herein as gems, gemstones, and/or diamonds, may be graded using four main aspects: Cut, Carat, Clarity, and Color. Cut refers to the physical shape the gem is cut into. Carat refers to the weight of the gem. Clarity refers to the impact of inclusions and blemishes in the gem. Color refers to the visible color of the gem. These characteristics may be used to grade gemstones by gemologists, and they also provide a way of identifying a gemstone. Understanding and identifying these characteristics is useful on several levels, including the establishing of a gem's market value and help in making the right choices when setting the gems in jewelry.

Gem color evaluation, for example, is based on the absence or presence of color, as well as the saturation and intensity of that color. In some examples, gems which include no defects, inclusions or impurities do not absorb visible light and thus produce no color under the appropriate light conditions. In other examples, diamond gems which include chemical impurities, inclusions and/or defects may absorb visible light to appear colored. And in many examples, diamond color distinctions are so subtle that they are difficult to discern by the human eye; however, these distinctions may make a difference in gem quality grading and therefore price.

A chemically pure and structurally perfect diamond has no color or hue and consequently, it may be given a higher grade and therefore, a higher value. A standard color scale used to grade diamonds ranges from D to H to N to Z colors, with D being completely colorless, and Z being visibly colored, with H and N being intermediate scaled variations.

But an example gem may have other physical characteristics, beyond the four enumerated above (i.e., cut, color, carat weight and clarity) for which these four grading categories do not apply and cannot capture. For example, two gems may be indistinguishable under normal standard light conditions, but when exposed to ultraviolet radiation, they may exhibit different color characteristics. Fluorescence is the emission of visible light as an immediate reaction of radiation with lower wavelengths radiated. In practice, this radiation may be in the form of exposure to UV radiation.

The reason that gems exhibit different levels of fluorescence may be due to their chemical makeup. For example, gems which include no defects or impurities may produce no fluorescence when exposed to UV radiation. In some examples, gems which do include chemical impurities and/or defects, may react to UV radiation and subsequently emit fluorescence when exposed to that radiation. This fluorescence could interact with the absorption of the gem and causes another perceived color under the standard illumination conditions which include a small portion of UV radiation. Thus, another characteristic of a gem to which a grade may be applied, besides cut, color, carat, and clarity, may be its reaction to UV radiation.

Fluorescence as a Grading Characteristic

Thus, because fluorescence may be used to identify and describe characteristics of a gem, it may be advantageous to standardize a set of examples, in order to aid grading and identification of gemstones. In some examples, in order to make a UV fluorescence standard, different categories of gem fluorescence may be identified and used for comparison. Such categories may be then used to grade the fluorescence levels/reactions of gems.

One such example of fluorescence categories may be a range of reactions from, for example, None (Non), Very Weak (VWk), Weak (Wk), Medium (Med), and Strong (Str), which describe the intensity reaction of a gem to UV radiation. As described above, the less fluorescence a gem demonstrates, this will indicate the presence of fewer specific impurities or lattice irregularities than a gem which exhibits more fluorescence when exposed to UV radiation. It should be noted that the labels of these categories and number of categories are merely exemplary, and not intended to be limiting. The number of categories may be more or less than five, and the category names could be different from those specifically described herein. In some examples, a broader range of fluorescence standards could be used to compare to an ungraded sample. In some examples, only two or three categories may be used.

Using UV fluorescence as a grading characteristic generally requires a set of grading references to compare against, just as those used to determine other characteristics. Such examples may be referred to as reference stones. For example, for color grading, comparison of a sample gemstone with reference stones takes place under controlled lighting with precise viewing conditions to establish a color value for that sample.

However, it is generally expensive and difficult to use a full and complete set of gems as reference stone standards that exhibit the five fluorescence characteristics, in a size that is actually helpful to a grader. Therefore, it may be advantageous to create a set of fluorescence standards that are not made of gems, but which exhibit the relevant fluorescence intensity and color when exposed to UV radiation. Such a non-gemstone standard set could then be portable, cheaper to make, yet accurate and helpful to support grading.

The systems and methods described here may be used to create a plurality of fluorescence standards that are not comprised of gemstones themselves, yet each of which has been calibrated to mimic fluorescence characteristics of a gemstone with a pre-determined fluorescence grade when both are subjected to the same fluorescence radiation source. As the standards display characteristics indicative of different fluorescence grades of gems, a gemologist would be able to compare the sample gem to the standard and make a decision on its grade.

Some examples of fluorescence characteristics include hue, intensity, distribution of the fluorescence, or location of the fluorescence within the gemstone. Fluorescence standards correspond to a reference gemstone with a different pre-determined fluorescence grade.

System Examples

As discussed, in order to elicit fluorescence or to grade fluorescence of an ungraded sample gem, the gem may be exposed to UV radiation. FIG. 1A shows an example system 150 which may be used to expose an ungraded sample gem to UV radiation to compare to a set of standards as described herein. In the example, the same source radiates both the ungraded sample, and the set of fluorescence standards at the same time, in the same general space, for consistent and accurate comparison.

Figure 1B:
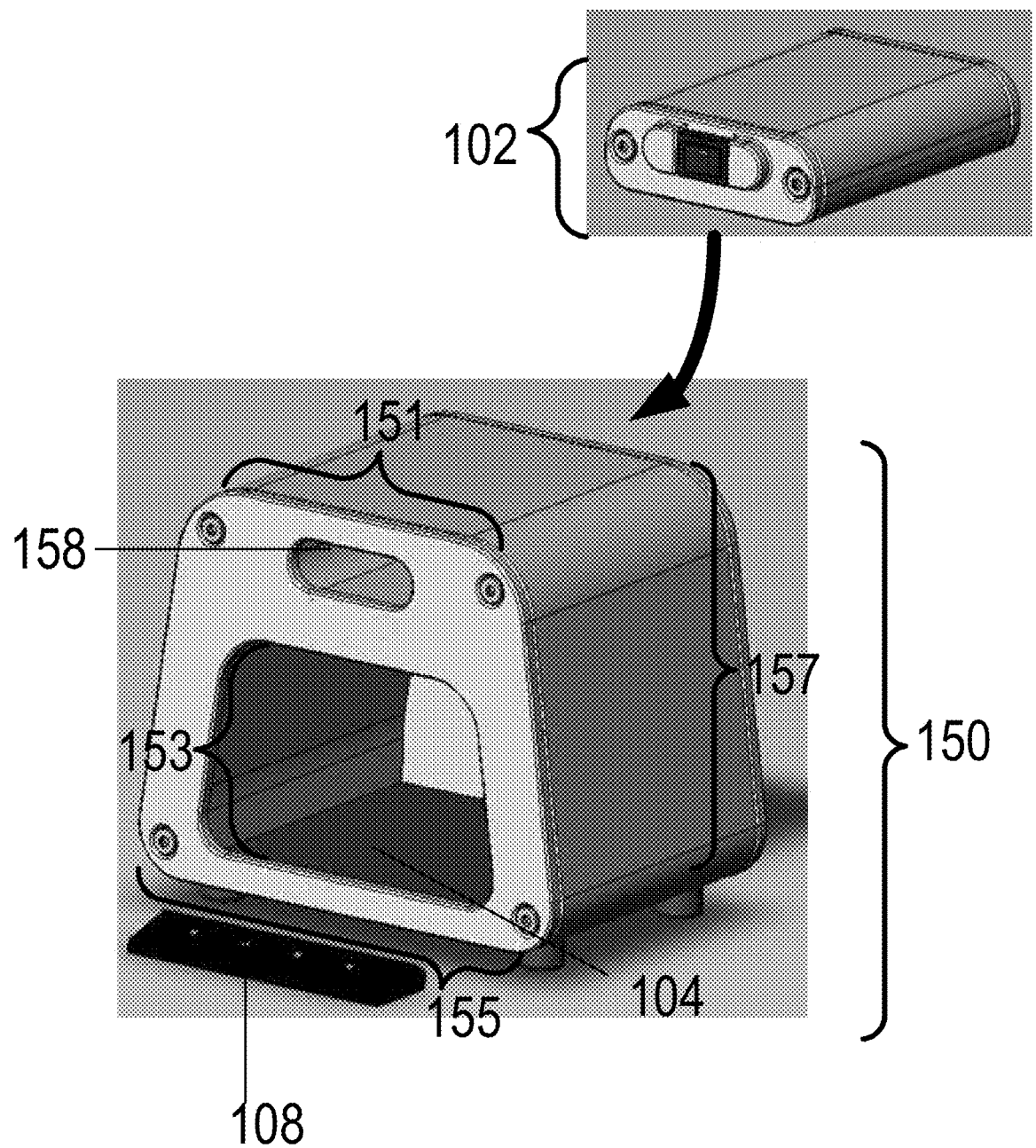

In some example embodiments, alternatively or in addition, the system in FIG. 1A that may be used to implement the methods described here, may include a platform 104 for positioning the ungraded sample gemstone, an ultraviolet (UV) radiation source 102 such as but not limited to light emitting diodes (LED) to provide illumination for the platform 104, and a set of non-gem fluorescence standards 106 each of which has been calibrated to mimic fluorescence characteristics of a gemstone with a pre-determined fluorescence grade when both are subjected to the UV radiation source 102. In the example, the system 150 includes a holder or shelf for the UV source 102 to be housed to illuminate the base platform stage or viewing area 104. Such a UV source 102 may include all the components necessary to provide the radiation, such as but not limited to a switch, power supply such as a battery or plug adapter, and an LED UV source. In the example embodiment of FIG. 1A, the UV source 102 is shown as a removable section and only a switch is visible. (FIG. 1B shows an exploded view of this UV source, separate from the main body.) Also shown is a viewing area or stage 104. The example viewing area 104 of the system 150 in FIG. 1A is shown as a base platform viewing area or stage 104 below the UV source 102 within which a sample may be studied.

In some examples, the fluorescence reference standards 106 may be placed within a holder 108 formed of non-transparent and non-fluorescent material. Such a holder 108 may have openings suitable for displaying each of the fluorescence standards 106 within the device. By using this holder 108 which shows the standards 106, the ungraded gem may be placed near the standards 106, on the stage 104 making visual comparison easy for a gemologist. Thus, the platform viewing area or stage 104 is shown with a generally flat portion upon which any kind of sample may be set. In the platform viewing area or stage 104 section, with the area reserved for a sample, a set of reference standards 106 in a bracket housing 108 may be placed or integrated. Such an arrangement would allow for both the sample and the standards 106 in its bracket housing 108 to be exposed to the same UV source for consistent and accurate grading. Such a set of standards 106 may be used in replacement of the set of master stones, and be cheaper, easier and more portable for a gemologist or other user as a comparison to grade the fluorescence of a gem. The number of standards 106 for grading may be any number, the example showing four references is merely exemplary. In some examples, the fluorescence standards may be arranged in a predetermined order and separated by material that does not emit fluorescence, thus more clearly showing the grading standards separately from one another.

FIG. 1B shows another detailed example system which may be used to practice the methods described herein. In FIG. 1B, the bracket housing 108 which may hold the standards 106 is shown next to the main body of the examination stage 150. In some examples, this bracket housing 108 is movable and portable, separate from the main housing 150. In some examples, this bracket housing 108 may be integrated into the stage 104 itself. In use, the bracket housing 108 is placed on the viewing area or stage floor 104 along with a sample stone to be evaluated (not pictured) if it is not already integrated into the stage floor 104.

In the example of FIG. 1B, the main body 150 includes a housing for a radiation element 102. In the radiation element 102, the UV radiation source is an LED configured to emit radiation at a particular wavelength, located with battery power and an on/off switch. In use, this radiation source 102 radiates into the stage area 104 and thereby radiates the sample stone under evaluation (not pictured) and the bracket housing 108. In the example of FIG. 1B, the UV radiation element 102 is removable from the main body of the examination stage 150 by sliding into the top shelf or sleeve 158 of the main body 150.

In some examples, the distance 153 from the stage floor 104 and the radiation source 102 when installed into the top 158 of the main body 150 is 2¾ inches 153. In some example embodiments, the distance 153 from the stage floor 104 and the radiation source 102 when installed in the top 158 of the main body 150 is between 2 and 3 inches.

In some example embodiments, the bracket housing 108 is 1 inch wide and 4 inches long. In some example embodiments, the main body 150 is 5 inches wide at the top 151 and 6¼ inches wide at the base 155. In some example embodiments, the main body 150 is 5 inches tall 157.

Illumination Examples

Under the UV radiation source, the grading may take place based on the characteristics of the fluorescence of the gem. But UV radiation may be presented in many various wavelengths. And the practical generation of such UV radiation sources may come from many sources. Therefore, it may be advantageous to determine a preferred wavelength range of UV radiation for fluorescence grading, and also the corresponding source to create those wavelengths.

Figure 2:
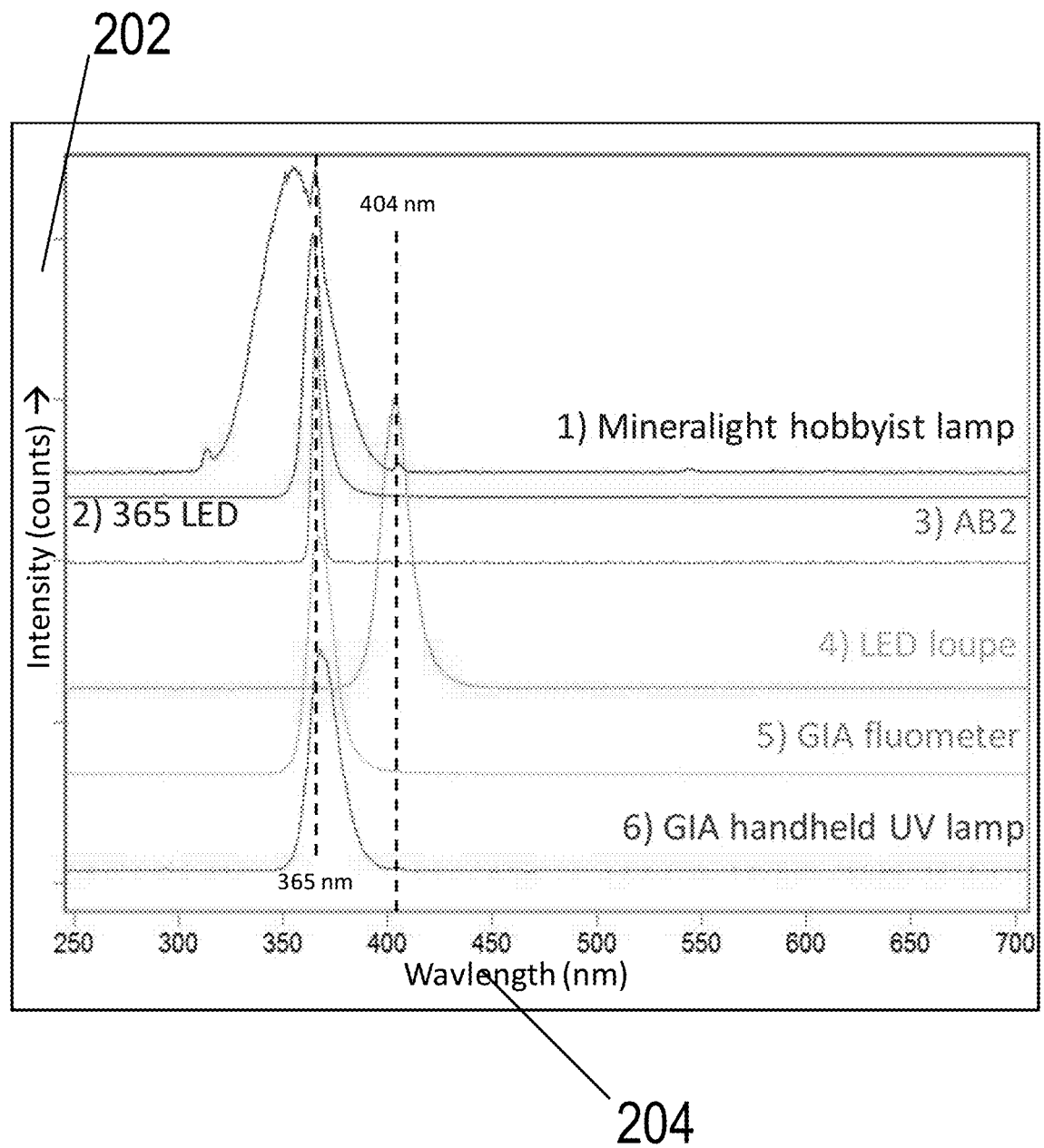
FIG. 2 is a chart used to explain wavelengths of UV light emitted by different light sources used in the gem industry and how they are variable between sources, according to the inventions described herein.

FIG. 2 shows an example graph of radiation intensity on the Y axis 202 and wavelength in nm on the X axis 204. The graph shows examples of various radiation sources and the wavelength of UV radiation that they emit. As can be seen by the chart, the sample lights are from 1) Mineralight brand hobbyist lamp; 2) custom 365 nm wavelength LED from Ocean Optics; 3) Thermo Aminco-Bowman II spectrometer; 4) off-the-shelf UV LED jeweler's loupe; 5) GIA custom-built fluometer; and 6) GIA LW-SW handheld UV lamp. As can be seen, UV light sources like these used in the gem industry are highly variable in both dominant wavelength and bandwidth. A narrow bandwidth and carefully constrained wavelength at 365 nm is preferable for accuracy and repeatability in observations and measurements of fluorescence. In some examples, an LED is used to create this radiation at or near 365 nm dominant wavelength.

In some examples, a preferred embodiment may be to utilize LEDs as a UV source. Such LEDs may be performing to a specific wavelength of UV radiation for exposing to gems. In some examples, such LEDs may have an output power of around 330 mW using a current of 500 mA and a voltage of 3.8 V.

In some examples, the UV light has a wavelength around 365 nm. In some examples, such UV source has a wavelength between 365 nm to 404 nm. In some examples, this range is approximate, and the wavelength is between 350 nm and 420 nm.

By using such example wavelengths, accurate and repetitive tests may be accomplished which produces a more consistent result. For example, using a wavelength other than 365 nm may result in gems displaying different or inconsistent fluorescence hues and/or intensities, depending on their internal makeup. With the use of a narrow band 365 nm, or similar wavelength, the gemstones may fluoresce in a more consistent and reproducible manner.

Grading Examples

As described above, the need for a non-gemstone set of fluorescence standards may be met by another material than the gems themselves, which react to UV radiation in the same way that a predetermined number of standard gemstones do. Such a set of standards that mimic different grades of fluorescence standards could be created and utilized more easily than a set of master stones. In some examples, the basic fluorescent material for the standard may be laminated paper or plastic that is replaceable by the user.

Figure 3A:
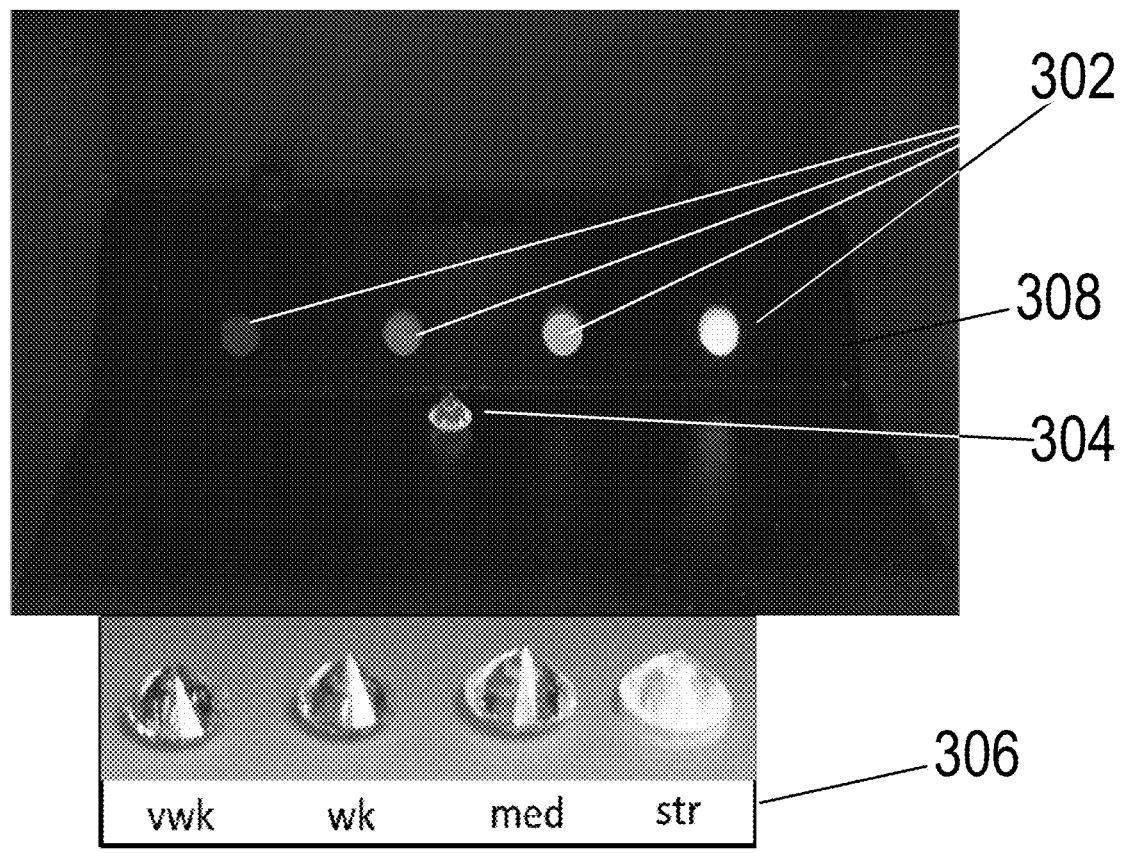
FIGS. 3A and 3B show example standards systems used to practice the inventions described herein.

In some example embodiments described here, such standards may be presented on a piece of paper or plastic. In such examples, the paper or plastic may include material or be made of material which reacts by fluorescing in response to UV radiation just as the predetermined standards do. FIG. 3A shows a non-limiting example where four standards 302 are presented in a holder 308 as shown in FIGS. 1A and 1B along with an ungraded sample 304. In use, the same UV source (not pictured) is used to illuminate all of the standards 302 and the ungraded sample 304. In this way, an observation may be made to the varying amounts of fluorescence reactions by the sample 304 as compared to the standards 302. In some examples, the sample gemstone 304 may be placed near or between the fluorescing standards 302. In such a way, the reaction to the UV radiation may be compared. A user may then determine which of the standards 302 most closely matches the ungraded sample gem 304 in order to apply a grade.

In some examples, the grades may be divided up into a number of categories, depending on the reaction or fluorescence of the gemstone: None (Non), Very Weak (VWk), Weak (Wk), Medium (Med), and Strong (Str). As described above, the crystal lattice makeup of the gemstone may be such that impurities or crystallographic irregularities may cause fluorescence whereas a completely pure diamond or gem produces no fluorescence. It should be noted that the number of standards and labeling of standards is not intended to be limiting and could be any number.

Figure 3B:
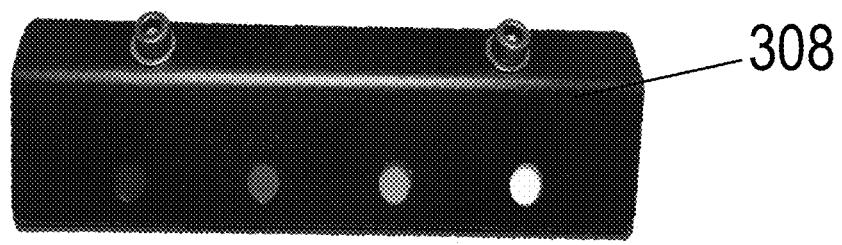

FIG. 3B shows an example bracket 308 or holder which may be used to house, display and/or otherwise contain the standards 302. The example bracket 308 as shown in FIG. 3B is made of metal with black paint covering it. In some examples, the bracket 308 is made of black anodized aluminum. In some examples, the holder is made of or coated in a material that does not fluoresce. In some examples, every screw, fastener, and portion of the bracket 308 may be made of or coated in material that does not fluoresce such as anodized aluminum and/or black paint. This is merely an example, but such material and makeup may be useful for separating the different levels of grading in the standard 302. In some examples, such an arrangement may make it easier to compare an ungraded sample gem 304 to the different fluorescence grade standards 302. If the standards were very close together, or the bracket housing fluoresced itself, there could be difficulty in comparison.

Figure 4A:
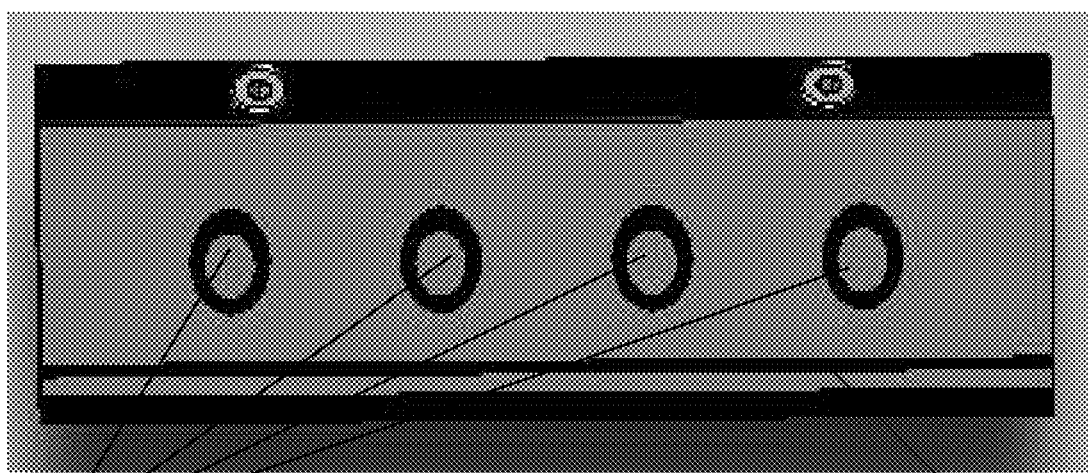
FIGS. 4A-4C show example supports showing the details used to practice the inventions described herein.

FIG. 4A shows another example of the bracket housing 408 with four holes 410 for the standards to be displayed. Again, the use of four holes for four reference standards is not intended to be limiting. In some example embodiments, the holes 410 may be at least 5 mm (0.5 cm) in diameter to allow enough fluorescence from reference to be visible for comparison with stones. In some examples, the holes 410 may be between 3 and 8 mm (between 0.3 and 0.8 cm) in diameter. In some examples, the holes 410 may be at least 8 mm (0.8 cm) in diameter. In some examples, the holes 410 may be oval shaped, circularly shaped, square shaped, rectangular shaped, diamond shaped, or any other shape.

In some examples, the holes 410 may be separated by a distance such that a proper comparison may be made with a sample gem under consideration. In some examples, the separated distance between the holes 410 may be enough so that a sample gemstone under evaluation may be placed between the holes 410 to allow for a proper comparison between standards. In some examples, the holes 410 for the standards are set 20 mm (2 cm) apart between edges to allow adequate separation for comparison with stones. In some example embodiments, the holes 410 are set between 10 and 30 mm (between 1 and 3 cm) apart between edges. In some examples, the holes 410 are set between 18 and 22 mm (between 1.8 and 2.2 cm) apart between edges. Any of various distances may be used, depending on the gemstone under evaluation.

Figure 4B:
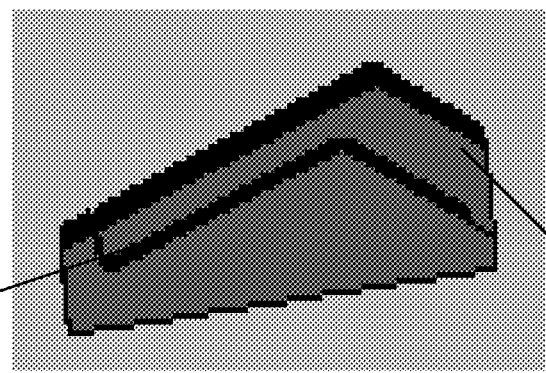
Figure 4C:
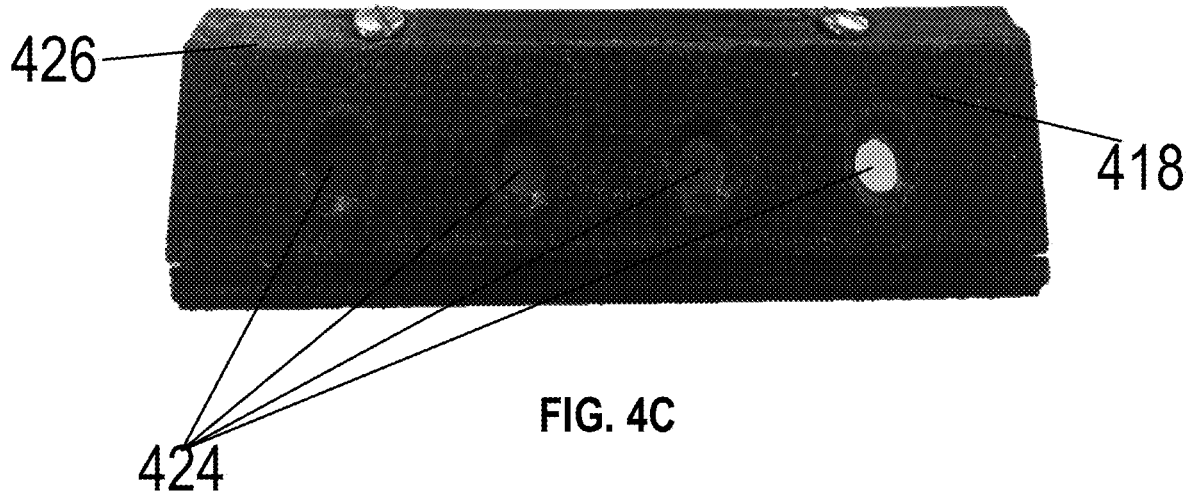

FIG. 4B shows a detail example of a corner 420 of the bracket housing 408. In FIG. 4B the ridges 420 show how a standard sample may be held in place as described herein. In some examples, the design also allows filters to be placed between the opening and the standard material to control intensity of the observed fluorescence. FIG. 4C shows another example of a bracket housing 418 with the standards 424 fluorescing. In this example the bracket housing has a hinge 426 which swings open to allow the material used to display the standards, such as a strip of paper or plastic, to be replaced, as described in FIG. 5A-5C.

In some example embodiments, the top piece 408 may be removable with screws to allow the user to replace the standard material as needed due to fluorescence degradation with time and exposure.

FIG. 5A shows an example of the bracket holder 508 open to place the background reference material strip 502 inside. FIG. 5B shows the bracket holder 508 in an open position with a filter 530 over the holes 510. The reference material strip may also be referred to herein as the fluorescence strip. When placed in the example holder 508, the windows or holes in the holder only allow the separated sections to be visible when the holder 508 is closed. Again, the number of standards examples is not intended to be limiting, and could be any number. In FIG. 5A an example filter 530 is shown. For example, the filter 530 may be a neutral density filter as described herein. In some examples, the filter 530 may include progressive or incremental filtration which cover the standards holes 510 to provide differences in the observable fluorescence of the standards.

FIG. 5C shows an example where the holder 508 is closed and the standards paper 502 and filters are in place. In some examples, because the standards paper or plastic strip 502 includes material with different properties on it, separated to be visible through the bracket 508 holes 510, the various standards may be viewed through the holes 510 as described herein. In other words, the standards strip is segmented into a corresponding number as the bracket holes 510, then prepared such that the different segments will react to the UV radiation in accordance with the predetermined fluorescence reaction which matches the predetermined standards categories. In some example embodiments, the standards paper 502 is uniform across its length, but a filter 530 includes carrying degrees of filtration to reduce the observable fluorescence. In some example embodiments, multiple filters may be utilized, one over each of the standards holes 510 to filter incrementally and make each standards hole 510 look different than the next under UV radiation by showing varying degrees of fluorescence.

It should be noted that in the sample holder 508, and strip 502, four references are displayed, but these four references may be used to define five categories, found between the displayed references, and a non-fluorescing standard category. In use, the stone under test is placed in front of/below the holes 510 or standard references or to the left or right of the four holes 510 or references, for inspection. Thus, in use, a stone under test may be examined to the left of the four references, between the first and second, between the second and third, between the third and fourth or to the right of the fourth. In such a way, the stone under examination may be compared to a None (Non), Very Weak (VWk), Weak (Wk), Medium (Med), and Strong (Str) standard.

Standards Creation Examples

In some examples, the fluorescence standards may be created using different fluorescence material deposited on a portable substrate such as but not limited to a paper strip, a laminated paper strip, or a plastic strip. In order to create the strip with the various categories, the material applied to the strip can be applied in different combinations to produce fluorescence equivalent to that of natural diamond, or other gem under consideration. By applying varying degrees of this material from one end of the strip to the other, a single strip may include a range of standards, from None (Non), Very Weak (VWk), Weak (Wk), Medium (Med), and Strong (Str). Such a strip may be placed in a holder as described here, and when one views the material through the holder windows, this can separate the standards visually, for a user. When subjected to UV radiation, the various standards on the segmented strip will then display characteristics of the different fluorescence categories as described herein.

In some examples, the standards may not be on a straight strip, but rather on a wheel, square, rectangle, hexagon, pentagon, or other shape instead. The use of the term "strip" is not intended to be limiting, and the standards could be arranged on a surface of any shape.

Some examples may use paper fluorescence standards, as its blue fluorescence is the closest to the blue fluorescence of diamonds. Inkpress Media paper with >90% brightness may be a preferred embodiment, as it closely mimics diamond fluorescence. In examples using just one strip of uniform paper, the filter(s) placed over the paper limit the amount of light or radiation that passes, incrementally from one standards hole to the next, thereby changing the appearance of the paper when exposed to UV radiation.

Other examples may be used for other gems. In some example embodiments, the process of creating fluorescence grading standards may include comparison to fluorescence results obtained from custom instrumentation used to assign fluorescence grades for lab reports, visual comparison with reference stones of known fluorescence intensity and color, and collection of fluorescence spectra for evaluation of correlation of standard pattern with natural diamond fluorescence patterns.

In some examples, the material on the strip may be used in combination with filters 530 to control visible intensity. In some examples, the material is coated with a thin plastic layer. In some examples, calibration of the strips to the standards may be accomplished by combination of paper, filters, and plastic coatings to achieve various intensities of blue fluorescence needed to create the necessary references.

Such filters 530 may be placed over the strip 502, when loaded into the bracket holder 508 as described in FIGS. 5A-C. In some examples, the filters 530 may be very thin with less light blocking capability or very thick with strong light blocking capability. In some examples, the filters may consist of multiple layers of different strength filters to obtain the needed level of light blockage. In some examples, the filters 530 may incrementally block light or radiation from one standard segment to the next.

Some examples employ use of neutral density filters positioned in front of the plurality of fluorescence standards. The neutral density filters may produce the most consistent results, for example, they may be the most consistent at displaying fluorescence in intensities that mimic those of a diamond. Such filters may allow light to pass through without changing wavelengths.

Neutral density filters of various grades, including but not limited to "Soft", "Medium", "Hard", and "Very Hard" (also known as LEE #298-0.15, #209-0.3, #210-0.6, #211-0.9), can be used in various combinations and layers to decrease the intensity of blue fluorescence from the paper standard material to achieve blue fluorescence intensities that correlate with different grades of natural diamond fluorescence.

As degradation may occur over time, the standards materials may need to be replaced. In some examples, when the degradation level gets close to or around 90%, the paper in the reference standards may need to be replaced.

Use Case Example

Figure 6:
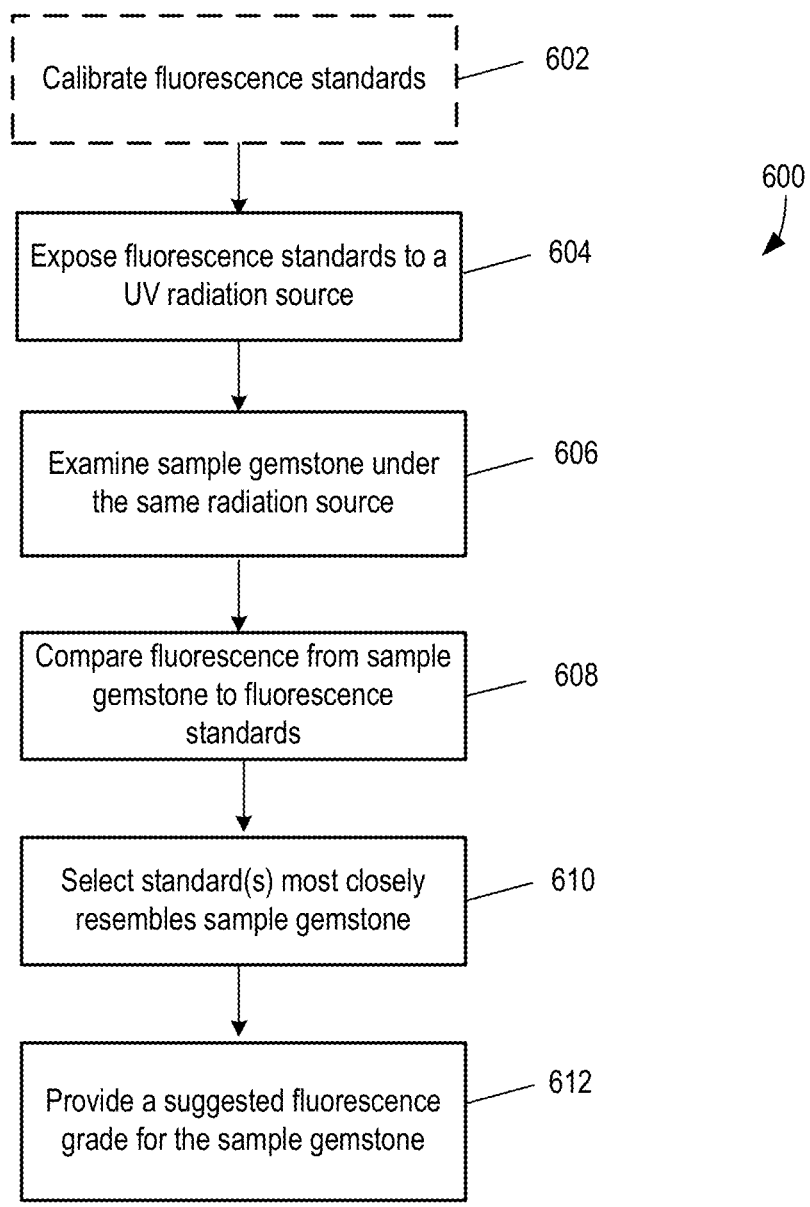
FIG. 6 shows an example flow diagram which may be used to practice the inventions described herein.

FIG. 6 shows a flow diagram 600 of an example of a method of using the systems and methods described herein. In the example, first, calibration of fluorescence standards to ensure quality are created 602. Next, the fluorescence standards are exposed to UV radiation 604. Next a sample gemstone is placed under the same UV radiation source 606. Thus, both the fluorescence standards and sample gemstone are at the same time, under the same UV radiation source. Next, a comparison is made between the sample gemstone and the fluorescence standards 608. In some examples, this comparison is made between the line of fluorescence standards, for example, either to the left of the leftmost standard, between the leftmost standard and the standard immediately next to it, or between the middle two standards, or to the left of the rightmost standard, between the rightmost standard and the standard immediately next to it, or to the right of the rightmost standard. Any combination of comparisons, in any order may be accomplished by a user, to compare the sample with the standards. Next, the user selects the standard that most closely resembles the sample gemstone 610. Finally, the user provides a suggested fluorescence grade for the sample gemstone, based on the comparison and selected resemblance 612.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although some presently preferred implementations of the embodiments have been specifically described herein, it will be apparent to those skilled in the art to which the embodiments pertain that variations and modifications of the various implementations shown and described herein may be made without departing from the spirit and scope of the embodiments. Accordingly, it is intended that the embodiments be limited only to the extent required by the applicable rules of law.

What is claimed is:

1. A method comprising: preparing a strip having a first end and a second end, with fluorescent material in increasing amounts from the first end to the second end, wherein the amounts of the fluorescent material are selected to mimic pre-determined fluorescence gem grades under fluorescent radiation, and wherein the strip is made of paper; placing the strip in a holder with a plurality of openings, such that the increasing amount of fluorescent material is shown through the plurality of openings, creating a plurality of divided categories; placing neutral density filters on the paper strip in the holder to decrease intensity of blue fluorescence from the fluorescent material; wherein the holder is on a stage large enough to accommodate the holder and a sample gemstone; wherein the stage includes a radiation source fixedly positioned between two and three inches above the holder and strip, wherein the radiation source emits a wavelength of about 365 nm; and applying radiation from the radiation source to the holder, the strip, and the stage.

2. The method of claim 1 wherein the radiation source emits a wavelength between 350 nm and 375 nm.

3. The method of claim 1 wherein the holder openings are four in number.

4. The method of claim 1 wherein the fluorescent material is paper with brightness>90% that closely mimics diamond fluorescence.

5. The method of claim 1 wherein the holder is coated in material that does not fluoresce.

6. The method of claim 1 wherein the stage and the radiation source are 2¾ inches apart.

7. A system comprising: a main body including a stage and a radiation source; a holder, adapted to fit onto the stage, the holder including a plurality of openings, the holder coated in material that does not fluoresce; a filter, adapted to cover a strip of paper, the filter including neutral density filters to decrease an intensity of blue fluorescence from the paper; the paper strip having a first end and a second end, the paper strip coated with fluorescent material in increasing amounts from the first end to the second end, wherein the paper strip and filter are adapted to fit into the holder such that the increasing amount of fluorescent material is shown through the openings, creating divided categories; wherein the amounts of the fluorescent material in the divided categories are selected to mimic pre-determined fluorescence gem grades under fluorescent radiation; wherein the radiation source is fixedly configured between two and three inches above the stage to emit radiation onto the holder, the strip, and the stage, and wherein the radiation source emits a wavelength between 350 nm and 375 nm.

8. The system of claim 7 further comprising, a filter configured to fit in the holder with the strip.

9. The system of claim 7 wherein the holder openings are four in number.

10. The system of claim 7 wherein the fluorescent material is paper with brightness>90% that closely mimics diamond fluorescence.

11. The system of claim 7 wherein the stage and the radiation source are configured 2¾ inches apart in the main body.

12. The system of claim 7 wherein the radiation source is detachable from the main body.

13. The system of claim 7 wherein the stage is configured to accommodate a sample gemstone along with the holder, and wherein the radiation source that is configured above the stage to emit radiation onto the holder, the strip, and the stage is also configured to emit radiation onto the sample gemstone.

14. The system of claim 7 wherein the stage is configured 2.5 inches below the radiation source.

* * * * *